ANALOG FUNCTION GENERATOR

Filed Oct. 12, 1964 2 Sheets-Sheet 1

INVENTOR
Keiva Feldman
BY
PATENT AGENT

Nov. 21, 1967 K. FELDMAN 3,354,299

ANALOG FUNCTION GENERATOR

Filed Oct. 12, 1964 2 Sheets-Sheet 2

INVENTOR
Keira Feldman
BY
James A. Hamby
PATENT AGENT 3,354,299

ANALOG FUNCTION GENERATOR

Keiva Feldman, Ottawa, Ontario, Canada, assignor to Computing Devices of Canada Limited, Ottawa, Ontario, Canada Filed Oct. 12, 1964, Ser. No. 403,225
5 Claims. (Cl. 235—197)

This invention relates to an electrical circuit for providing a voltage which represents a predetermined function of the magnitudes of a plurality of input voltages. In particular, this invention relates to an electrical circuit arrangement for providing a voltage which represents the square root of the sum of the squares of two numbers each represented by an input voltage.

Circuit arrangements for generating such functions are known. One such circuit has been described in an article by Stern and Lerner entitled "A Circuit for the Square Root of the Sum of the Squares" in the Proceedings of the I.E.E.E., vol. 51, No. 4 (April 1963) pages 593–596. The circuit described in this article produces a piecewise linear approximation to the desired function, which is, of course, smoothly varying. The approximation may be regarded as placing a circle by an inscribed polygon, the accuracy of the approximation increasing with the numbei of sides of the polygon. In this circuit each segment of the polygon in a given quadrant is generated by a separate resistor pair. Consequently a relatively large number of components are required in the circuit.

The present invention also makes use of an approximation to the desired function but for the same order of accuracy it requires fewer components than the Stern circuit. The circuit arrangement according to this invention provides an output voltage that is at any time the result of a combination of currents flowing through different paths in the circuit and the individual components or elements in the circuit are not identified with different segments of the polygonal approximation.

It is an object of this invention to provide an electrical circuit of novel design useful for computing the square root of the sum of the squares of two numbers each represented by an input voltage.

Figure 1:
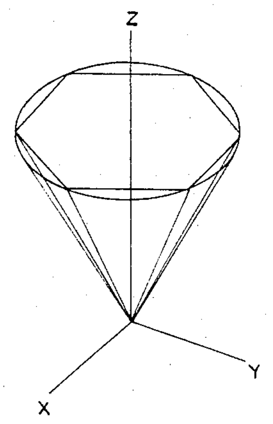
Figure 2:
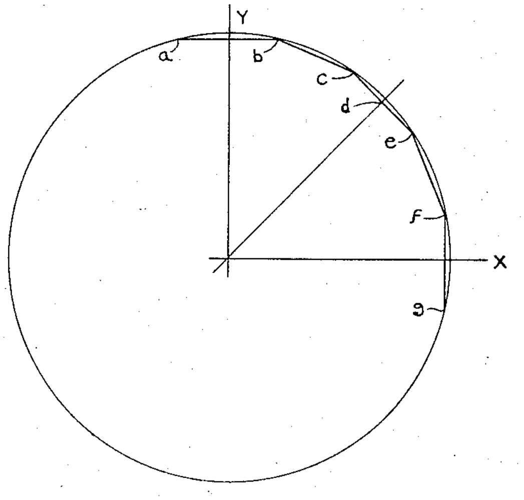
Figure 3:
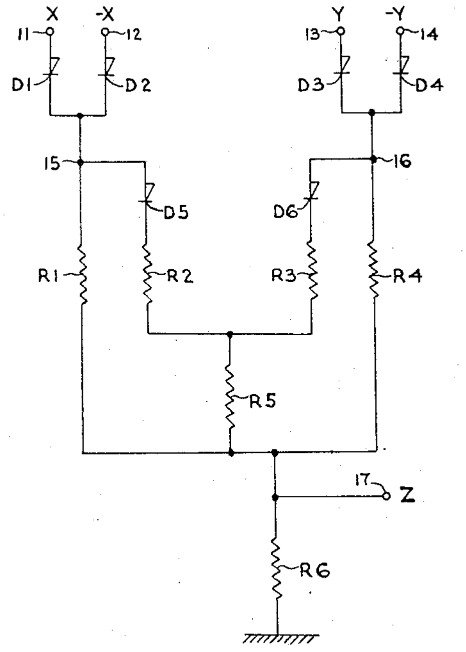
Figure 4:
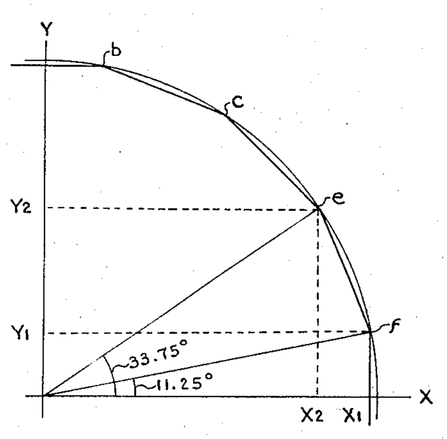
Figure 5:
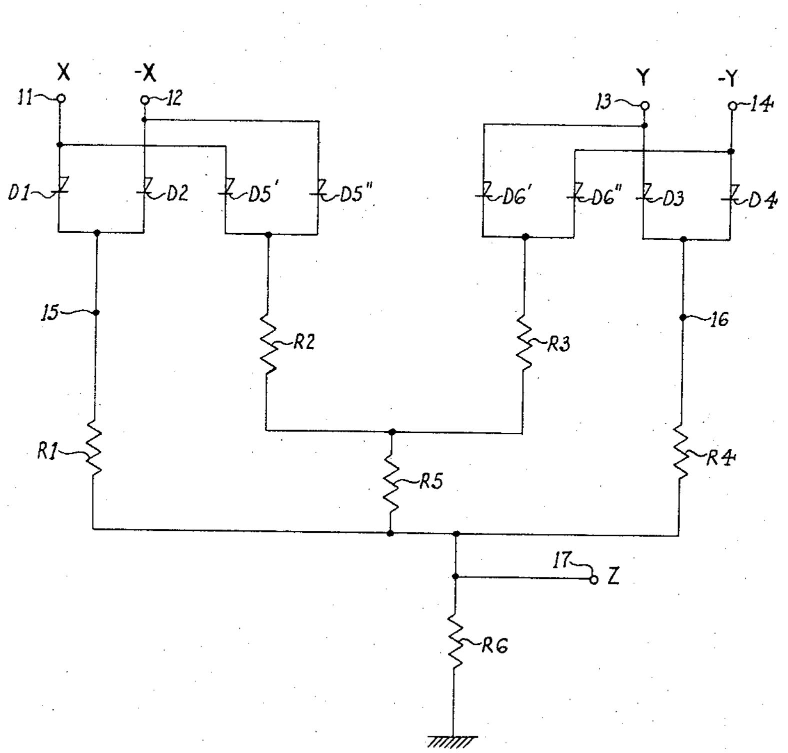

Other objects of this invention will become apparent by referring to the specific embodiment described in the following specification and shown in the accompanying drawings in which:

FIGURE 1 represents two three dimensional surfaces, a cone and a pyramid, useful in describing the relationship between an output voltage and two input voltages used in explaining the invention, FIGURE 2 is a horizontal cross-section of two surfaces as depicted in FIGURE 1 but where the pyramid has a greater number of sides, FIGURE 3 is a schematic diagram of a circuit embodying the invention, FIGURE 4 shows the upper right hand quadrant of FIGURE 2 in more detail, and FIGURE 5 is a schematic diagram of a modification of the circuit of FIGURE 3.

In the following discussion the two input voltages, which may be analog representations of numerical values, are referred to as X and Y. The output voltage is referred to as Z. The equation relating the voltage is $$Z^2 = X^2 + Y^2 \qquad [A]$$

This relationship may be represented, as shown in FIG. 1, by a right circular cone with its axis coinciding with the Z axis. The surface of the cone represents the solutions of Equation A. A piecewise linear approximation may be obtained by using the surface of a pyramid inscribed in the cone, as shown in FIG. 1, to represent the solution. Each face of the pyramid represents a voltage obtained from a linear combination of voltages X and Y.

The specific electrical circuit to be described produces an approximation to the exact solution of Equation A which may be represented by a sixteen sided pyramid. In FIG. 1, the pyramid is shown as having only six sides for ease of illustration, however, it will be apparent that the pyramid could have any convenient number of sides. As previously mentioned, a sixteen sided pyramid is used in the following description and FIGURE 2 depicts the cross-section through such a sixteen sided pyramid.

In horizontal cross section, as shown in FIG. 2, the cone and pyramid appear as a circle with an inscribed polygon. Thus the representation in FIG. 2 is valid only for a contant value of Z. For simplicity of description the representation of FIG. 2 will be used hereafter. However it will be understood that this represents the approximation for one arbitrarily chosen value of Z. A similar representation to FIGS. 1 and 2 is used in the aforementioned article to illustrate the problem.

A circuit arrangement for producing an output voltage which is an approximation to the solution of Equation A is shown in FIG. 3.

In FIG. 3, input terminals 11 and 12 are provided to receive oppositely phased sources of the voltage X, and input terminals 13 and 14 are provided to receive oppositely phased sources of the voltage Y. Input terminals 11 and 12 are connected to a junction point 15 by diodes D1 and D2 respectively. Input terminals 13 and 14 are connected to a junction point 16 by diodes D3 and D4 respectively.

Junction points 15 and 16 are connected to an output terminal 17 by a network including resistances and diodes as follows. A resistor R1 connects junction point 15 to output terminal 17. A resistor R4 connects junction point 16 to output terminal 17. A diode D5, a resistor R2 and a resistor R5 are arranged in series between junction point 15 and output terminal 17. A diode D6 and a resistor R3 are arranged in series between junction point 16 and the junction of resistors R2 and R5.

A resistor R6 is connected from output terminal 17 to ground. This resistor may be replaced by the input resistance of any equipment connected to the output terminal 17. All diodes D1–D6 are poled so as to conduct current in a direction from the input terminals towards the output terminal.

The operation of the circuit will now be described with regard to FIG. 2 which shows a sixteen sided polygon inscribed in a circle. Diodes D1, D2, D3 and D4 ensure that only positive voltages are applied to junction points 15 and 16 regardless of whether the voltages X and Y are positive or negative. Thus in describing the circuit operation only the upper right hand quadrant of FIG. 2, where the voltages X and Y are positive, need be considered.

If it is known that the input voltages assume only positive values then the circuit may be simplified by omitting diodes D2 and D4.

Considering first the situation where the X and Y input voltages are equal, the circuit is in a condition corresponding to the point *d* in FIG. 2. All branches of the network are conducting, the currents flowing through R1 and R4 are equal to one another, the currents flowing through R2 and R3 are equal to one another.

As the voltage Y increases and the voltage X decreases, the operating point of the circuit moves along the segment *dc* of the polygon. It will be remembered that FIG. 2 represents the action of the circuit subject to the constraint that Z remains constant and thus the voltages X and Y are considered to vary so as always to satisfy Equation A with a constant value of Z. Corresponding to the movement of the operating point along *dc* the current through R1 and R2 decreases and the current through R3 and R4 increases.

When the X and Y voltages obtain values corresponding to the point $c$ in FIG. 2 diode D5 becomes back-biased and resistor R2 no longer conducts current. The consequent alteration of current paths in the circuit causes the operating point to follow the segment $cb$ of the polygon as Y continues to increase and X decrease. At input voltages corresponding to point $b$ diode D1 becomes back-biased and the X voltage does not influence the output voltage along the segment $ba$.

The action of the circuit in producing segments $de$, $ef$ and $fg$ of the polygon is similar. Thus as the voltage X increases and the voltage Y decreases from their initially equal value at point $d$, the operating point of the circuit moves along segment $de$ of the polygon. When the X and Y voltages attain values corresponding to the point $e$ in FIG. 2 diode D6 becomes back-biased and current no longer flows through resistor R3. The consequent alteration of current paths in the circuit causes the operating point to follow the segment $ef$ of the polygon as X continues to increase and Y decreases. At input voltages corresponding to point $f$ diode D3 becomes back-biased and during operation along segment $fg$ the Y voltage has no effect on the output voltage.

It can be seen from FIG. 2 that the closest fit of the polygon to the circle is obtained when the polygon is regular. This corresponds to the best approximation possible with the circuit but clearly it is possible to vary slightly from regularity and still obtain a satisfactory approximation.

From considerations of symmetry it can be seen that R1 and R4 must be equal, similarly R2 and R3 must be equal. This leaves four independent resistance values to be calculated; the ratios between the four values can be expressed by three equations.

Referring now to FIG. 4, which is a more detailed view of one quadrant of FIG. 2, operating point $f$ is shown to correspond to input voltages $X_1$ and $Y_1$ and operating point $e$ is shown to correspond to input voltages $X_2$ and $Y_2$. Each side of the regular sixteen sided polygon subtends an angle of 22.5° at the centre.

It will be remembered that when the circuit reaches operating point $f$ diode D3 is cut-off. The necessary condition for this is $$\frac{R6}{R6+\frac{R1(R2+R5)}{R1+R2+R5}}X_1=Y_1$$

From FIG. 4 it can be seen that $$X_1 \text{ Tan } 11.25°=Y_1$$

Hence $$\frac{R6}{R6+\frac{R1(R2+R5)}{R1+R2+R5}}=\text{Tan } 11.25° \quad \text{[B]}$$

When the circuit reaches operating point $e$ diode D6 is cut off. The necessary condition for this is $$\frac{R5}{R2+R5}(X_2-Z)=Y_2-Z \quad \text{[C]}$$

To evaluate this equation it is necessary to know the value of Z the output voltage. At point $f$ the output voltage must equal Y, since diode D3 is just cut-off. Since FIGS. 2 and 4 apply to a constant value of Z, at point $e$ the output voltage must also equal $Y_1$.

Thus, from FIG. 4 is can be seen that $$X_2=Y_2 \text{ Cot } 33.75°$$

and $$Y_2=\frac{\text{Sin } 33.75°}{\text{Sin } 11.25°}Y_1$$

Substituting the values of Z, $X_2$ and $Y_2$ in Equation C results in the second ratio equation $$\frac{R5}{R2+R5}=\frac{\text{Sin } 33.75°-\text{Sin } 11.25°}{\text{Cos } 33.75°-\text{Sin } 11.25°} \quad \text{[D]}$$

The final ratio equation is obtained by noting that the segment $ef$ of the polygon corresponds to a constant output voltage. To meet this condition it is necessary that the increment in current caused by X changing from $X_2$ to $X_1$ must equal the decrement in current caused by Y changing from $Y_2$ to $Y_1$. The necessary condition for this is $$\frac{X_1-X_2}{\frac{R1(R2+R5)}{R1+R2+R5}}=\frac{Y_2-Y_1}{R1}$$

Using the relationships between $X_2$ and $Y_2$, $X_1$ and $Y_1$, $Y_2$ and Y which have been set forth above, the relationship may be reduced to provide a third ratio equation as follows:

$$\frac{R1+R2+R5}{R2+R5}=\frac{\text{Sin } 33.75°-\text{Sin } 11.25°}{\text{Cos } 11.25°-\text{Cos } 33.75°} \quad \text{[E]}$$

Evaluation of the ratio Equations B, D and E leads to the required ratios between the resistor values:

$$R1:R2:R3:R4:R5:R6=1:0.31:0.31:1:0.41:0.10$$

While these ratios lead to the desired values of resistors it is possible to vary slightly from these ratios, e.g., by using the nearest standard values of resistors, and still obtain a satisfactory approximation.

When the values of the selected resistors are low enough to be comparable with the forward impedance of the diodes, an error may be introduced because the current path including R1 has one diode in series whereas the current path including R2 has two diodes in series. The current paths through R3 and R4 differ ln similar fashion.

The modified circuit shown in FIG. 5 is designed to avoid such errors. In this circuit diode D5 is replaced by two diodes D5′ and D5″ and diode D6 is replaced by two diodes D6′ and D6″. Diode D5′ has its anode connected to input terminal 11 and its cathode connected to resistor R2. Diode D5″ has its anode connected to input terminal 12 and its cathode connected to resistor R2. Diode D6′ has its anode connected to input terminal 13 and its cathode connected to resistor R3. Diode D6″ has its anode connected to input terminal 14 and its cathode connected to resistor R3.

The operation of the modified circuit shown in FIG. 5 corresponds closely to the operation of the circuit of FIG. 3 which has already been described. The diode pairs D5′, D5″, and D6′, D6″ perform the same function as diodes D5 and D6 respectively. The two diodes in any one pair never conduct simultaneously. It will be apparent that the current path through R1 has one diode in series, and the current path through R2 has also one diode in series, thus removing the aforementioned possible source of error.

It is believed that the circuit arrangement described herein provides an improved means for obtaining a computation of the square root of the sum of the squares of two numbers each represented by an input voltage.

I claim:

1. An electrical circuit arrangement comprising,
a first and a second input terminal,
a first and a second junction point,
a first unilaterally conducting device connected between said first input terminal and said first junction point,
a second unilaterally conducting device connected between said second input terminal and said second junction point,
an output terminal,
a first resistor connected between said output terminal and ground,
two identical sets of current flow paths connected between said output terminal and said first and second junction points respectively,
each said set consisting of a first resistive path and a second resistive and unidirectionally conductive path,
said second paths, one from each set, having a resistive portion in common.

2. An electrical circuit arrangement comprising,
a first and a second input terminal for receiving a first and a second source of voltage respectively,
a first unilaterally conducting device connected between said first input terminal and a first junction point,
a second unilaterally conducting device connected between said second input terminal and a second junction point,
said first and second unilaterally conducting devices being poled to conduct towards said first and second junction points respectively,
an output terminal,
a first resistor connected between said first junction point and said output terminal,
a second resistor connected between said second junction point and said output terminal,
a third unilaterally conducting device and a third resistor connected in series between said first junction point and a third junction point,
a fourth unilaterally conducting device and a fourth resistor connected in series between said second junction point and said third junction point,
said third and fourth unilaterally conducting devices being poled to conduct towards said third junction point,
a fifth resistor connected between said third junction point and said output terminal,
and a sixth resistor connected between said output terminal and a common ground connection,
the resistance values of said first resistor, said second resistor, said third resistor, said fourth resistor, said fifth resistor and said sixth resistor being in the ratio of about 1:1:0.31:0.31:0.41:0.10.

3. An electrical circuit arrangement comprising,
a first and a second input terminal for receiving oppositely phased sources of a first voltage representing the value of a first quantity,
a third and a fourth input terminal for receiving oppositely phased sources of a second voltage representing the value of a second quantity,
a first unilaterally conducting device connected between said first input terminal and a first junction point,
a second unilaterally conducting device connected between said second input terminal and said first junction point,
said first and second unilaterally conducting devices being poled to conduct towards said first junction point,
a third unilaterally conducting device connected between said third input terminal and a second junction point,
a fourth unilaterally conducting device connected between said fourth input terminal and said second junction point,
said third and fourth unilaterally conducting devices being poled to conduct towards said second junction point,
an output terminal for providing a third voltage representing the value of the square root of the sum of the squares of said first and second quantities,
a first resistor connected between said first junction point and said output terminal,
a second resistor connected between said second junction point and said output terminal,
a fifth unilaterally conducting device and a third resistor connected in series between said first junction point and a third junction point,
a sixth unilaterally conducting device and a fourth resistor connected in series between said second junction point and said third junction point,
said fifth and sixth unilaterally conducting devices being poled to conduct towards said third junction point,
a fifth resistor connected between said third junction point and said output terminal,
and a sixth resistor connected between said output terminal and a common ground connection,
the resistance values of said first resistor, said second resistor, said third resistor, said fourth resistor, said fifth resistor and said sixth resistor being the ratio of about 1:1:0.31:0.31:0.41:0.10.

4. An electrical circuit arrangement comprising,
a first and a second input terminal for receiving oppositely phased sources of a first voltage representing the value of a first quantity,
a third and a fourth input terminal for receiving oppositely phased sources of a second voltage representing the value of a second quantity,
a first unilaterally conducting device connected between said first input terminal and a first junction point,
a second unilaterally conducting device connected between said second input terminal and said first junction point,
said first and second unilaterally conducting devices being poled to conduct towards said first junction point,
a third unilaterally conducting device connected between said first input terminal and a second junction point,
a fourth unilaterally conducting device connected between said second input terminal and said second junction point,
said third and fourth unilaterally conducting devices being poled to conduct towards said second junction point,
a fifth unilaterally conducting device connected between said third input terminal and a third junction point,
a sixth unilaterally conducting device connected between said fourth input terminal and said third junction point,
said fifth and sixth unilaterally conducting devices being poled to conduct towards said third junction point,
a seventh unilaterally conducting device connected between said third input terminal and a fourth junction point,
an eighth unilaterally conducting device connected between said fourth input terminal and said fourth junction point,
said seventh and eighth unilaterally conducting devices being poled to conduct towards said fourth junction point,
an output terminal,
a first resistor connected between said first junction point and said output terminal,
a second resistor connected between said fourth junction point and said output terminal,
a third resistor connected between said second junction point and a fifth junction point,
a fourth resistor connected between said third junction point and said fifth junction point,
a fifth resistor connected between said fifth junction point and said output terminal, and
a sixth resistor connected between said output terminal and a common ground connection,
the resistance values of said first resistor, said second resistor, said third resistor, said fourth resistor, said fifth resistor and said sixth resistor being in the ratio of about

1:1:0.31:0.31:0.41:0.10

5. An electrical circuit arrangement comprising,
a first and a second input terminal for receiving a first and a second source of voltage respectively, a first unilaterally conducting device connected between said first input terminal and a first junction point,
a second unilaterally conducting device connected between said second input terminal and a second junction point,
an output terminal,
a first resistor connected between said first junction point and said output terminal,
a second resistor connected between said second junction point and said output terminal,
a third unilaterally conducting device and a third resistor connected in series between said first junction point and a third junction point,
a fourth unilaterally conducting device and a fourth resistor connected in series between said first junction point and a third junction point,
a fifth resistor connected between said third junction point and said output terminal,
and a sixth resistor connected between said output terminal and a common ground connection,
the resistance values of said first resistor, said second resistor, said third resistor, said fourth resistor, said fifth resistor and said sixth resistor being in the ratio of about 1:1:0.31:0.31:0.41:0.10,
said first, second, third and fourth unilaterally conducting devices being poled so that the current therethrough is commonly directed with respect to said output terminal.

References Cited

UNITED STATES PATENTS

| | | | |
|---|---|---|---|
| 2,899,550 | 8/1959 | Meissinger et al. ----- | 328—143 |
| 2,919,066 | 12/1959 | White -------------- | 235—192 |
| 3,231,766 | 1/1966 | Lowenstein et al. ---- | 307—88.5 |

MALCOLM A. MORRISON, *Primary Examiner.*

F. D. GRUBER, *Assistant Examiner.*